UNITED STATES PATENT OFFICE

ADAM SCHMITT, OF NEW ORLEANS, LOUISIANA.

OIL COMPOUND FOR LEATHER.

SPECIFICATION forming part of Letters Patent No. 329,960, dated November 10, 1885.

Application filed July 30, 1885. Serial No. 173,096. (No specimens.)

*To all whom it may concern:*

Be it known that I, ADAM SCHMITT, of the city of New Orleans, in the parish of Orleans and State of Louisiana, have invented a new and useful Oil Compound; and I do hereby declare that the following is a full, clear, and exact description of the invention, which will enable others skilled in the art to which it appertains to make and use the same.

My invention relates to that class of compounds used to oil leather in order to render it smooth, impermeable, and elastic; and it consists of a composition formed of rubber, (caoutchouc,) fish-oil, and aromatics.

To prepare this compound I dissolve three pounds of dry strung gutta-percha (caoutchouc) or rubber cut fine in one gallon of cotton-seed oil, the white part of one cocoanut, one (1) ounce white thyme, and one-quarter pound pomegranate-rind. The whole is allowed to soak forty-eight hours. I then put the composition in an earthen jar; then place it in a kettle and let it boil ten hours. After the boiling I take it off and let it cool twelve hours; then add ten gallons Newfoundland codfish-oil, and set to boil again in the same manner as above for eight hours. When the composition has cooled once more, I add six ounces rosemary to destroy the smell of the codfish-oil.

I claim—

A compound consisting of oils known ordinarily as "cotton-seed" and "codfish" oil, in combination with a solution of rubber, (caoutchouc,) cocoanut, pomegranate-rind, and an aromatic, substantially as and for the purpose specified.

ADAM SCHMITT.

Witnesses:
A. DREYFOUS,
A. SOUZA.